United States Patent [19]

Shimoda et al.

[11] 4,004,817
[45] Jan. 25, 1977

[54] TONE ARM ASSEMBLY IN RECORD PLAYER

[76] Inventors: Seisuke Shimoda; Yoshiaki Shimoda, both of 20-11, Nakajujo-3-chome, Kita, Tokyo; Harutada Shimoda, 333, Oaza Segasaki, Urawa, all of Japan

[22] Filed: July 7, 1975

[21] Appl. No.: 593,518

[30] Foreign Application Priority Data

July 4, 1974 Japan .............................. 49-75808

[52] U.S. Cl. ............................................ 274/23 R
[51] Int. Cl.² ............................................ G11B 3/10
[58] Field of Search ................................ 274/23 R

[56] References Cited

UNITED STATES PATENTS

| | | | |
|---|---|---|---|
| 1,963,673 | 6/1934 | Patino | 274/23 R X |
| 3,865,384 | 2/1975 | Yoshida | 274/23 R |

FOREIGN PATENTS OR APPLICATIONS

| | | | |
|---|---|---|---|
| 699,621 | 11/1953 | United Kingdom | 274/23 R |

*Primary Examiner*—Charles E. Phillips
*Attorney, Agent, or Firm*—Armstrong, Nikaido & Wegner

[57] ABSTRACT

A tone arm assembly installed on a face plate of a record player housing, is constructed such that said tone arm assembly is easily divided into two sections, one a tone arm structure for supporting the tone arm and allowing it to horizontally and vertically oscillate and the other a supporting structure for holding said tone arm structure over the face plate. The two sections can be aligned and coupled to each other by a single manual motion for operation of the record player. The coupling sections of many tone arm structures each having a different tone arm are formed in the same form so that any of the tone arm structures can be selectively aligned and coupled to one another and the same supporting structure. A lead-out portion for pick-up lead wires therethrough to the outside is provided at one side of said supporting structure.

5 Claims, 3 Drawing Figures

TONE ARM ASSEMBLY IN RECORD PLAYER

BACKGROUND OF THE INVENTION

The present invention relates to the improvements in a tone arm assembly and is devised to obviate the following shortcomings of a tone arm assembly of the known art. In other words, generally a lover of record music cannot be satisfied with using only a single tone arm but enjoys himself over respective sounds by selectively changing various types of tone arms, and for doing so in most cases he practically changes the entire tone arm assembly installed on a face plate including a lifter (dash-pot). For this reason, preparation of various types of tone arms to enable them to be changed is expensive and reinstallment of a tone arm assembly each time requires a considerably amount of work. Usually, a user of a record player is not accustomed to such mechanical operation. Hence, unless tone arms are easily exchangeable by a simple motion, change of tone arms may become a burden for him, thus resulting in reduced chances for enjoyment of a variety of sounds through changing tone arms. Furthermore, in a base of a tone arm assembly of the prior art there is a vertical hollow portion, through which lead wires from a pick-up of a tone arm pass and enter the record player housing through an opening provided immediately below in a face plate, the wires being connected to an amplifier therefrom. Thus, each time an auxiliary tone arm as well as a main tone arm are provided, it is necessary to provide a considerably large opening in the face plate, which requires an extreme amount of work for an ordinary user.

SUMMARY OF THE INVENTION

The present invention is intended for obviating the aforesaid shortcomings of the tone arm assembly. Firstly, the tone arm assembly which has conventionally been formed of a single structure is constructed such that said tone arm assembly is easily divided into two sections one a tone arm structure for supporting the tone arm and allowing it to horizontally and vertically oscillate and the other a supporting structure for holding said tone arm structure over a face plate. The two sections can be aligned and coupled to each other by a single manual motion for operation of the record player. The coupling sections of many tone arm structures each having a different tone arm are formed in the same form respectively so that any of the tone arm structures each having different tone arms can be selectively aligned and coupled the same supporting structure. Secondly, the lead wires from the pick-up are led out not through the face plate but at one side of the supporting structure and above the face plate to eliminate the opening in the face plate.

DETAILED DESCRIPTION OF THE PREFERRED EMBODIMENT

Figure 1:
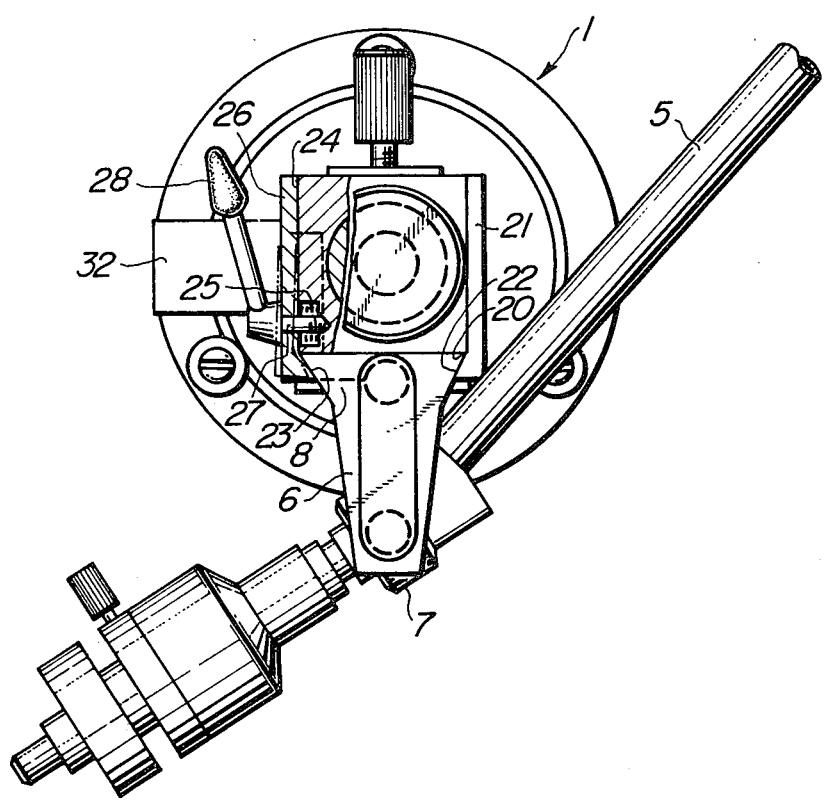
FIG. 1 is a plan view showing an embodiment of the present invention with certain parts cut away.
Figure 2:
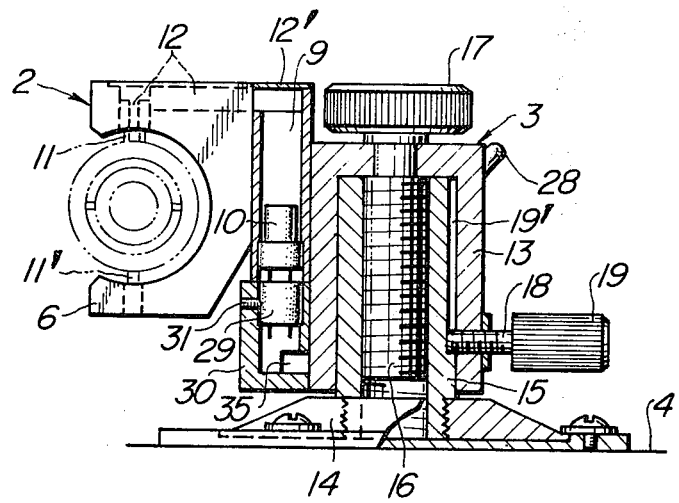
FIG. 2 is a front view thereof with certain parts shown in longitudinal section and other parts cut away with the tone arm and the vertical bearing member of the tone arm being shown schematically by chain lines.
Figure 3:
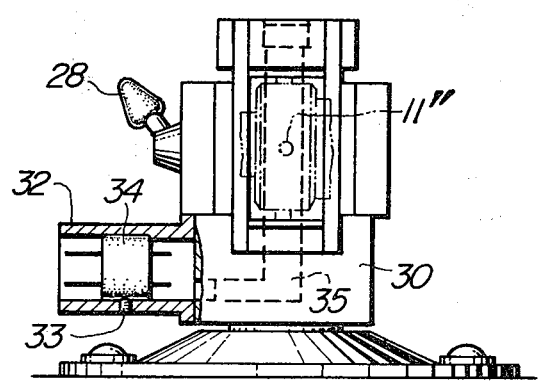
FIG. 3 is a side view thereof as viewed at a right angle with the line of vision taken in FIG. 2 with certain parts shown in longitudinal section and other parts cut away with the tone arm and the vertical bearing member of the tone arm being shown schematically by the chain lines.

Referring to the drawings, 1 designates a tone arm assembly comprising a tone arm structure 2 and a supporting structure 3 for holding said tone arm structure 2 over a face plate 4 of a record player. The tone arm structure 2 comprises a tone arm 5 and bearing members 6, 7 which support the tone arm 5 so it can oscillate horizontally and vertically. The rear end portion of the bearing member 6 is formed with an engaging portion 8. 9 is a hollow portion of the engaging portion, and coupled to the lower end of the hollow portion is a socket 10. Lead wires (not shown) are provided on the upper end terminal of said socket and a pick-up (not shown) connected to the lead wires is located at the tip end of the tone arm. 11, 11' are horizontal oscillation support pins for the tone arm 5 respectively, 11" is a vertical oscillation support pin, 12 a through-hole for the lead wires and 12' a cover plate. The supporting structure 3 comprises a lifting tube 13 and a base 14. The lifting tube 13 is slidably and coveringly coupled onto a cylinder 15 on the base 14 and can be slidably moved up and down by rotating with a handle 17. A screw stock 16 is threadably coupled to internal threads of the cylinder 15. 18 is a set screw threadably coupled to a tapped hole provided in the body of the lifting tube. The forward tip of said screw 18 is rotated by a handle 19 and made to contact the cylinder 15, thereby fixing the lifting tube with reference to said cylinder. 19' is a key way provided in the cylinder 15. The forward end portion of the screw 18 is slidably mounted in the key way, thus preventing the rotation of the lifting tube during its upward or downward movement. 20 is a dovetail groove provided in the front portion of the lifting tube which is engages by the bearing member 6. A side plate 21 fixedly secured to one side of the lifting tube is formed with a side portion 22 of the dovetail groove 20. Another side plate 26 which functions as an engaging means is hinged at one end to side portion 24 and biased by a compression spring 25, away from the side portion 24 of the lifting tube, is formed with another side portion 23 of the dovetail groove 20. The side plate 26 can be displaced from an aligned and fixed position to an open position of chain lines as shown in FIG. 1 by rotating a handle 28 with screw 27 screwed into and through said plate 26 and engaged in the side portion 24, thus turning the screw in one direction will tighten plate 26 against portion 24 and turning the screw in the opposite direction will loosen plate 26 loosening the engagement of the engaging portion 8 of bearing member 6 with the dovetail groove 20. The screw 27 and handle 28 constitute on operating means. 29 is a plug engaging with the socket 10 provided in the engaging portion 8 of the bearing member 6. The plug 29 is coupled in and secured by a small screw 31 to the upper opening of a hollow portion of a case 30 provided in contact with the lower end of the dovetail groove at the forward portion of the lifting tube. 32 is a lead-out tube portion which projects from the side of the lifting tube for leading out the pick-up lead wires therethrough. A plug 34 coupled in and secured by a small screw 33 to said tube portion 32 is connected by lead wires (not shown) to the plug 29 provided in the case portion 30. 35 is a through-hole for said lead wires and extends at a right-angle between the lifting tube and the lead-out tube portion and along the joining portion between the lifting tube and the case portion 30, thereby connecting the hollow portion of the lead-out tube portion with the hollow portion of the case portion. The pick-up lead wires are led out through a socket (not shown) cooperating with the plug 34 and connected to an amplifier outside of the record player housing.

To couple the tone arm structure to the supporting structure, firstly, the side portion 23 of the dovetail groove is opened by rotating the handle 28 with fingers, and then the engaging portion 8 of bearing member 6 is inserted into the dovetail groove from above and at the same time the plug 29 engages with the socket 10. Next, if the handle 28 is rotated in the reverse direction to restore the side portion 23 of dovetail groove to the position shown, then the engaging portion is aligned and fixed in place, thus effecting the engagement of both structures. These two structures are thus coupled to each other, with the engaging portions serving as coupling sections for the many tone arm structures each having a different tone arm thus many tone arms having different characteristics can be selectively used with only one supporting structure fixedly provided on the face plate 4. This is a significant characteristic feature of the present invention. The supporting structure is adhered to the face plate 4 in this embodiment. However, it is needless to say that the supporting structure can be fixedly secured by means of tap bolts or screws.

The aforesaid various results can be expected of the tone arm assembly produced according to the present invention. Moreover, as shown in the embodiment above, such an advantage is presented that if lifting means of coupling sections of both structures is added to the supporting structure, the range of adjustment of position of the tone arm can be widened so large in the case of the selective coupling of a different tone arm. Additionally, if the lifter (dash-pot) of tone arm is attached to a suitable place of the supporting structure (at the lifting tube in the above embodiment), one and the same lifter can be used in common with various tone arms. It goes without saying that this is further advantageous as compared with known devices.

What is claimed is:

1. A tone arm assembly for a record player, said assembly comprising:
   a. a tone arm structure means including a tone arm with a pickup at one end thereof and bearing means for supporting said tone arm said bearing means having an engaging portion and a socket, said tone arm having lead wires passing therethrough connecting said socket to said pickup; and
   b. supporting structure means mounted on the housing of said record player said supporting structure means including an engaging means including a dovetail groove for engaging said engaging portion of said bearing means, plug means mounted on said supporting structure means and having lead wires for connection to an amplifier when said engaging means engages said engaging portion of said bearing means, operating means including a screw means wherein the rotation of said screw means moves one side of said dovetail groove into and out of contact with said engaging portion of said bearing means whereby when said operating means moves said engaging means into engagement with said engaging portion said tone arm structure means is held in said supporting structure means and said plug means is concurrently connected to said socket means thereby enabling said pickup to be connected to said amplifier and wherein when said operating means moves said engaging means out of engagement with said engaging portion said tone arm structure means is removable from said supporting structure.

2. The tone arm assembly of claim 1 wherein said screw means comprises a screw and a handle for rotating said screw.

3. The tone arm assembly of claim 1, wherein said one side of said dovetail groove comprises a side plate which pivots about one end and has a dovetail portion at the other end.

4. The tone arm assembly of claim 1, wherein said supporting structure means includes a base, a cylinder mounted on said base and a lifting tube mounted over said cylinder.

5. The tone arm assembly of claim 4, wherein said supporting structure means further includes means for adjusting the position of said lifting tube on said cylinder.

* * * * *